(No Model.) 4 Sheets—Sheet 1.

H. C. CROWELL.
UNIVERSAL SHAFT COUPLING.

No. 333,449. Patented Dec. 29, 1885.

Witnesses.
W. R. Edelin
H. M. Stington

Inventor.
Hilen C. Crowell
per. J. H. Sturgeon
Att'y

N. PETERS, Photo-Lithographer, Washington, D. C.

(No Model.) 4 Sheets—Sheet 2.

H. C. CROWELL.
UNIVERSAL SHAFT COUPLING.

No. 333,449. Patented Dec. 29, 1885.

Witnesses.
W. R. Edden.

Inventor
Hilen C. Crowell
per
Att'y (No Model.)  4 Sheets—Sheet 3.

H. C. CROWELL.
UNIVERSAL SHAFT COUPLING.

No. 333,449.  Patented Dec. 29, 1885.

Witnesses.
W. R. Edelen.
H. M. Sturgeon.

Inventor
Hilen C. Crowell
Per. H. Sturgeon
Att'y

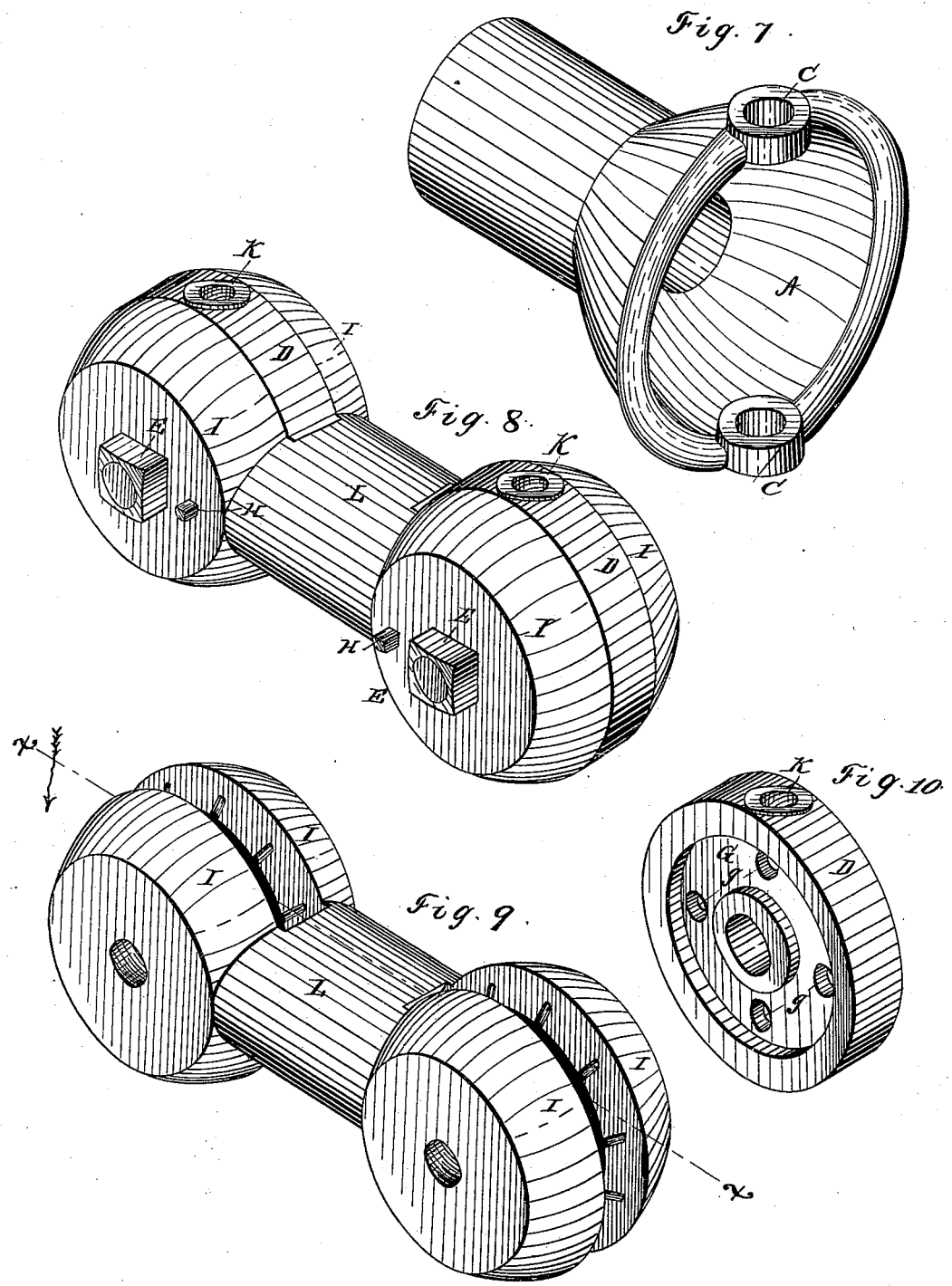

UNITED STATES PATENT OFFICE.

HILEN CANFIELD CROWELL, OF ERIE, PENNSYLVANIA.

UNIVERSAL SHAFT-COUPLING.

SPECIFICATION forming part of Letters Patent No. 333,449, dated December 29, 1885.

Application filed August 10, 1885. Serial No. 174,036. (No model.)

*To all whom it may concern:*

Be it known that I, HILEN C. CROWELL, a citizen of the United States, residing at Erie, in the county of Erie and State of Pennsylvania, have invented certain new and useful Improvements in Universal Shaft-Couplings; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to universal shaft-couplings, whereby two sections of a shaft may be coupled together so as to run any angle to each other desired, and also improvements in the construction of such couplings, whereby a lubricator may be retained therein and the operative parts of the coupling kept continuously lubricated.

These and other features of my invention are hereinafter set forth and described in the specification and claims.

Figure 1:
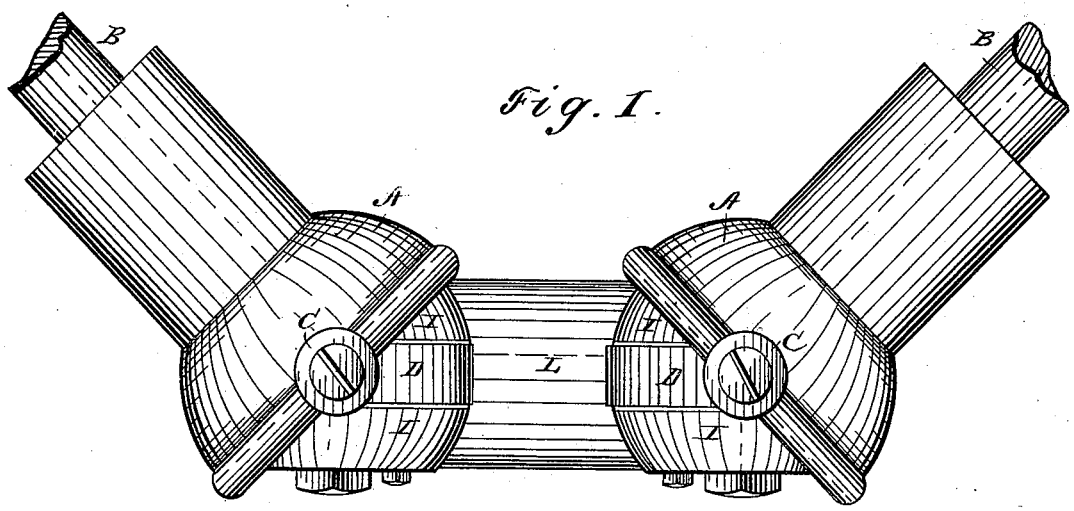
Figure 2:
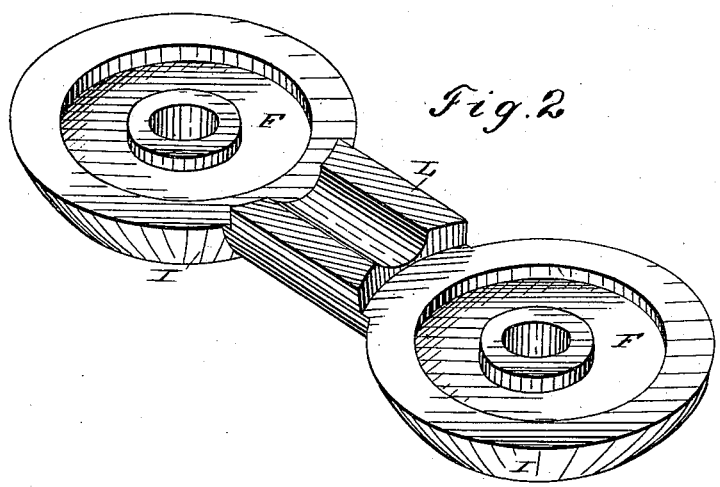
Figure 3:
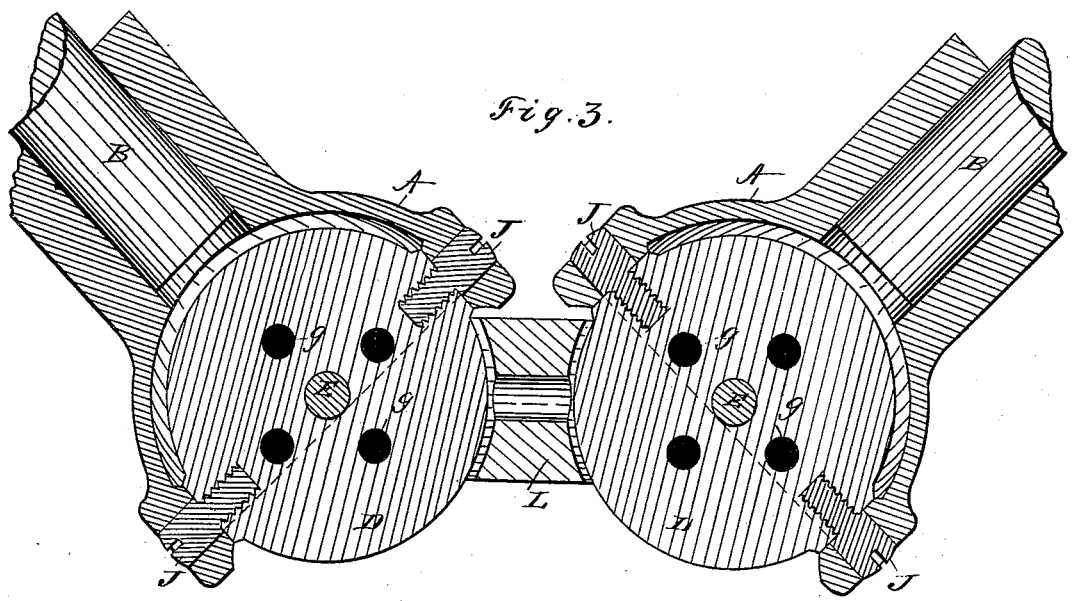
Figure 4:
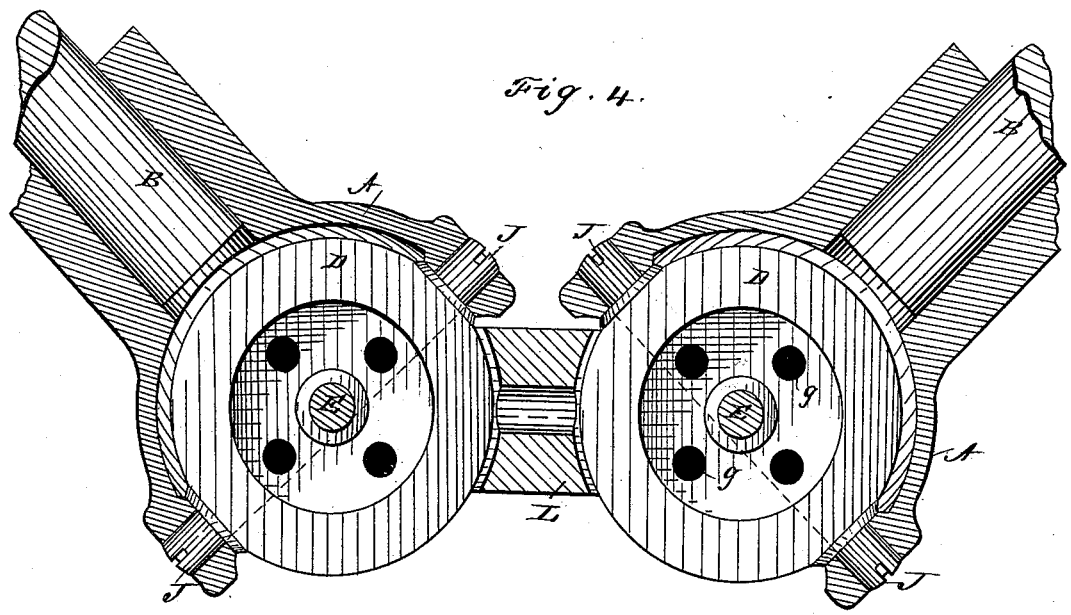
Figure 5:
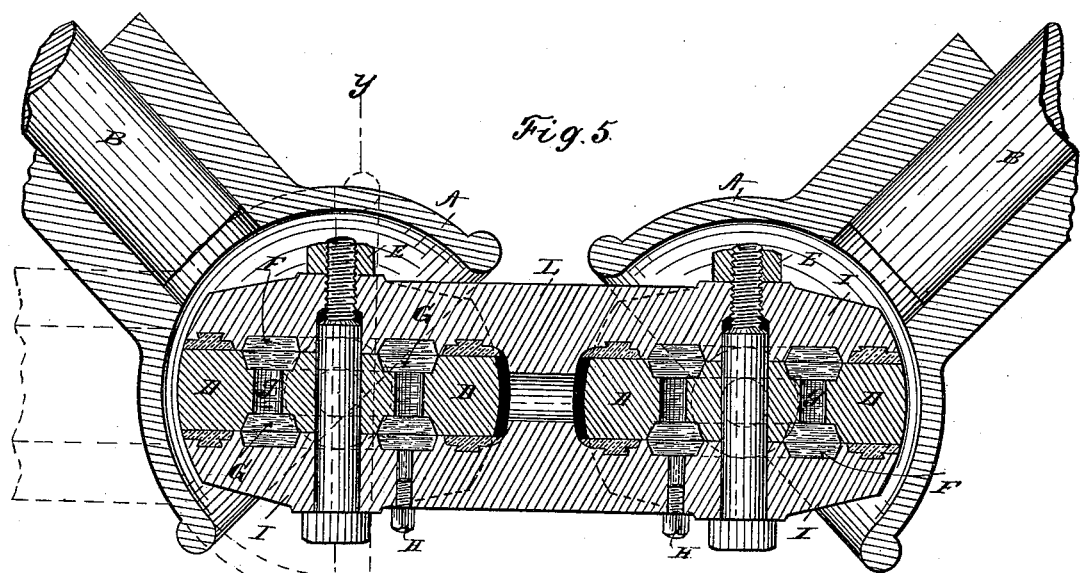
Figure 6:
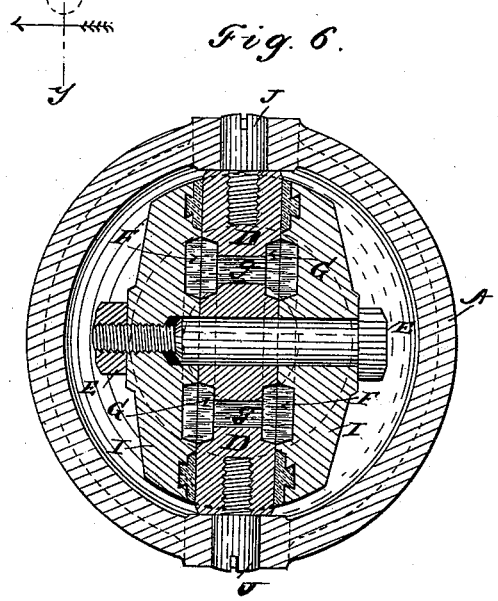

In the accompanying drawings, illustrating my invention, Figure 1 is a plan view of my improved coupling, showing sections of two shafts coupled together at right angles to each other therewith. Fig. 2 is a horizontal central section of the central portion, Fig. 9, of the coupling, taken in the direction of the line $x\ x$ in Fig. 9, showing oil-chambers therein. Fig. 3 is a longitudinal central section of my device. Fig. 4 is a like longitudinal central section of my device, with the disks therein in elevation. Fig. 5 is a longitudinal central section of my device, taken at right angles to that shown in Figs. 3 and 4. Fig. 6 is a transverse section of one end of my improved coupling on the line $y\ y$ in Fig. 5, looking in the direction of the arrow. Fig. 7 is a perspective view of one of the socket ends or parts of the coupling to be secured to a shaft-section. Fig. 8 shows a perspective view of the central section of the coupling with the disks Fig. 10 therein complete. Fig. 9 shows a like view of the central section of my improved coupling with the disks Fig. 10 removed therefrom. Fig. 10 is a perspective view of one of the disks in either end of the central section of the coupling, and shows the oil-chambers in and also openings through the disk for the passage of the oil from one side or chamber to the other.

Like letters refer to like parts in all the figures.

In the construction of my device I first construct sockets A A, adapted to be secured to shaft-sections B B. These sockets A A are provided with openings C in the opposite edges thereof, adapted to receive pins attached to the disks D, Fig. 10, as illustrated in Figs. 1, 2, 4, 5, and 7, and hereinafter described. The central section, L, is placed between the end sections, A A, and secured to them by means of screw-pins J J, passed through the openings C into the movable disks D D, Fig. 10, secured in either end of the central section, L, Fig. 8, as hereinafter described. These disks D D are fitted into the ends of the section L, Fig. 8, so that they will revolve freely upon bolts E E, which pass through the ends of sections L, Fig. 8, and through the disks D D transversely, so as to form journals upon which the disks D D revolve. The inner portion of the section L, Fig. 8, is recessed out at F F, as illustrated in Fig. 2, and the disks D, which fit into the ends of the central section, L, Fig. 8, are also constructed with recesses G on each side thereof, as shown in Fig. 10, and also provided with openings $g$, through which oil or other lubricator placed therein will pass from one side of the disks D D to the other, the recesses in the sides of these disks D, together with the recesses F F in the central section, L, Fig. 8, forming oil or lubricator chambers on either side of the disks D. Oil-plugs H H are inserted on one side of either end of the central section, L, Fig. 8, which communicate with the chamber opposite the disks D D, so that the chambers F and G may be filled with oil or other lubricating material, and the same retained therein.

In fitting these couplings up the disks D are preferably turned up true and babbitted into place between the portions I I of the central section, L, Fig. 8, so that perfect faces are formed between them, against which the disks D will freely rotate between the portions I I of the section L, Fig. 8, of the coupling. The central section, L, Fig. 8, is coupled to the socket ends A A of the coupling by means of screw-bolts J J, which pass through the holes C in the socket ends A A, and are firmly screwed into openings K K in the edges of the disks, in the manner illustrated in Figs. 3 and 4.

The operation of this device is so obvious to those skilled in the art to which it appertains that further description thereof is unnecessary.

I am aware that shaft-sections have heretofore been coupled together with universal joints or couplings, which permitted them to rotate at different angles to each other; but I am not aware of any universal shaft-coupling having been constructed in the manner shown and described, so that the wearing-surfaces thereof are distributed over the surfaces of disks in the manner in which I do it; neither am I aware of any such coupling having been constructed with oil chambers or reservoirs for the retention of oils or other lubricators, so that the coupling is substantially self-lubricating.

Having thus fully described my invention, so as to enable others skilled in the art to which it appertains to construct and use the same, what I claim as new, and desire to secure by Letters Patent of the United States, is—

1. The combination, in a universal shaft-coupling, of socket-pieces, substantially as shown, adapted to be secured to shaft-sections, with a connecting central section provided with rotary disks, substantially as shown, and trunnion-pins connecting said rotary disks with the socket portions of the coupling, substantially as set forth.

2. The combination, in a universal shaft-coupling, of socket-pieces, adapted to be secured to shaft-sections, with a connecting central section provided with rotary disks in the ends thereof, and having oil-reservoirs on either side of said disks, and trunnion in said disks for connecting the same with the sockets, substantially as and for the purpose set forth.

3. In a universal shaft-coupling, the combination of the central section, L, thereof, having oil-chambers F F and oil-plugs H H in each end thereof, substantially as shown, with rotary disks D, having oil-chambers G and openings $g$ therein, and journal-bolts E, substantially as and for the purpose set forth.

4. The combination, in a universal shaft-coupling, of the socket-pieces A A, provided with trunnion-pin openings C C, with the central section, L, provided with rotary disks D D, having oil-chambers F G on either side thereof, the journal-bolts E, and trunnion J J, all constructed and operating together substantially as and for the purpose set forth.

In testimony whereof I affix my signature in presence of two witnesses.

HILEN CANFIELD CROWELL.

Witnesses:
C. SWALLEY,
H. M. STURGEON.